US012667894B2

(12) United States Patent　　　(10) Patent No.:　US 12,667,894 B2
Bernaden et al.　　　　　　　　　　(45) Date of Patent:　　Jun. 30, 2026

(54) DRILLING TOOL INCLUDING A STEP DRILL BIT

(71) Applicant: MILWAUKEE ELECTRIC TOOL CORPORATION, Brookfield, WI (US)

(72) Inventors: Zachary D. Bernaden, Milwaukee, WI (US); Jason M. Thom, Wauwatosa, WI (US); Milorad Marich, Mequon, WI (US); Jonathan G. Winter, Burlington, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 435 days.

(21) Appl. No.: 17/796,047

(22) PCT Filed: Jan. 18, 2021

(86) PCT No.: PCT/US2021/013800

§ 371 (c)(1),
(2) Date: Jul. 28, 2022

(87) PCT Pub. No.: WO2021/154521

PCT Pub. Date: Aug. 5, 2021

(65) Prior Publication Data

US 2023/0054585 A1　　Feb. 23, 2023

Related U.S. Application Data

(60) Provisional application No. 62/967,092, filed on Jan. 29, 2020.

(51) Int. Cl.
B23B 51/00　　　　(2006.01)
(52) U.S. Cl.
CPC ........ B23B 51/009 (2013.01); B23B 51/0003 (2022.01)

(58) Field of Classification Search
CPC .......................... B23B 51/0003; B23B 51/009
See application file for complete search history.

(56) References Cited

U.S. PATENT DOCUMENTS 3,645,640 A * 2/1972 Zukas ....................... B23B 5/16
　　　　　　　　　　　　　　　　　　　408/82
6,146,476 A 11/2000 Boyer
(Continued)

FOREIGN PATENT DOCUMENTS

CN　　　107498050 A　　12/2017
DE　102014208134 A1　　11/2015
(Continued)

OTHER PUBLICATIONS

Extended European Search Report for Application No. 21746996.4 dated Feb. 2, 2024 (10 pages).
(Continued)

*Primary Examiner* — Eric A. Gates
(74) *Attorney, Agent, or Firm* — Michael Best & Friedrich LLP

(57) ABSTRACT

A drilling tool includes a drive assembly with a shank that is configured to couple to a power tool and a step drill bit. The step drill bit includes a body having a proximal end adjacent the shank, a distal end opposite the proximal end, and a bit axis extending centrally through the body between the proximal end and the distal end. The body is defined by a wall extending around the bit axis to define a hollow interior cavity of the body. The step drill bit also includes a plurality of axially stacked, progressively sized steps with a first step at the proximal end and a terminal step at the distal end and a flute extending from the proximal end to the distal end. The flute defines a cutting edge.

14 Claims, 6 Drawing Sheets

(56)     References Cited

U.S. PATENT DOCUMENTS

| | | | |
|---|---|---|---|
| 8,764,355 B2 | 7/2014 | Durfee | |
| 11,453,069 B2 * | 9/2022 | Ward | B23B 51/009 |
| 2012/0148356 A1 | 6/2012 | Lohmeier | |
| 2014/0023445 A1 | 1/2014 | Allen | |
| 2014/0086697 A1 | 3/2014 | Kakimoto et al. | |
| 2016/0157423 A1 | 6/2016 | Stoffel et al. | |
| 2017/0165766 A1 * | 6/2017 | Van Essen | B23P 15/28 |

FOREIGN PATENT DOCUMENTS

| | | | |
|---|---|---|---|
| EP | 2711112 A1 | 3/2014 | |
| EP | 3205464 A1 | 8/2017 | |

OTHER PUBLICATIONS

Chinese Patent Office Action for Application No. 202180007664.9 dated Feb. 8, 2024 (16 pages including machine English translation).

International Search Report and Written Opinion for Application No. PCT/US2021/013800 dated May 3, 2021 (12 pages).

Chinese Patent Office Action for Application No. 202180007664.9 dated Nov. 16, 2024 (12 pages including statement of relevance).

* cited by examiner (SECTION A-A)

DRILLING TOOL INCLUDING A STEP DRILL BIT

CROSS REFERENCE TO RELATED APPLICATION

This application is a national stage filing under 35 U.S.C. § 371 of International Application No. PCT/US2021/013800, filed on Jan. 18, 2021, which claims the benefit of U.S. Provisional Patent Application Ser. No. 62/967,092, filed on Jan. 29, 2020, the entire contents of all of which are incorporated by reference herein.

BACKGROUND

The present invention relates to power tool accessories. More specifically, the present invention relates to step drill bits.

Step drill bits are used in a variety of applications and industries where a user may need to drill holes through, for example, a thin-walled work piece. A step drill bit allows a user to drill holes in a progressive range of sizes with a single bit. Step drill bits can be coupled to a power tool such as a drill or an impact driver.

SUMMARY

In one independent aspect, the invention provides a drilling tool including a drive assembly with a shank that is configured to couple to a power tool and a step drill bit. The step drill bit includes a body having a proximal end adjacent the shank, a distal end opposite the proximal end, and a bit axis extending centrally through the body between the proximal end and the distal end. The body is defined by a wall extending around the bit axis to define a hollow interior cavity of the body. The step drill bit also includes a plurality of axially stacked, progressively sized steps with a first step at the proximal end and a terminal step at the distal end and a flute extending from the proximal end to the distal end. The flute defines a cutting edge.

In another independent aspect, the invention provides a step drill bit including a body having a proximal end, a distal end opposite the proximal end, and a bit axis extending centrally through the body between the proximal end and the distal end. The body is defined by a wall extending around the bit axis to define a hollow interior cavity of the body. The step drill bit also includes a plurality of axially stacked, progressively sized steps with a first step at the proximal end and a terminal step at the distal end and a flute extending from the proximal end to the distal end. The flute defines a cutting edge.

In yet another independent aspect, the invention provides a method of manufacturing a step drill bit. The method includes forming a body by an additive manufacturing process. The body includes a proximal end, a distal end opposite the proximal end, a hollow interior cavity, a plurality of axially stacked, progressively sized steps including a first step at the proximal end a terminal step at the distal end, and a flute extending from the proximal end to the distal end. The method also includes forming a cutting edge on the body adjacent the flute.

In yet another independent aspect, the invention provides a method of manufacturing a step drill bit. The method including forming a body by a molding process. The body includes a proximal end, a distal end opposite the proximal end, a hollow interior cavity, a plurality of axially stacked, progressively sized steps including a first step at the proximal end a terminal step at the distal end, and a flute extending from the proximal end to the distal end. The method also includes forming a cutting edge on the body adjacent the flute.

Other aspects of the disclosure will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
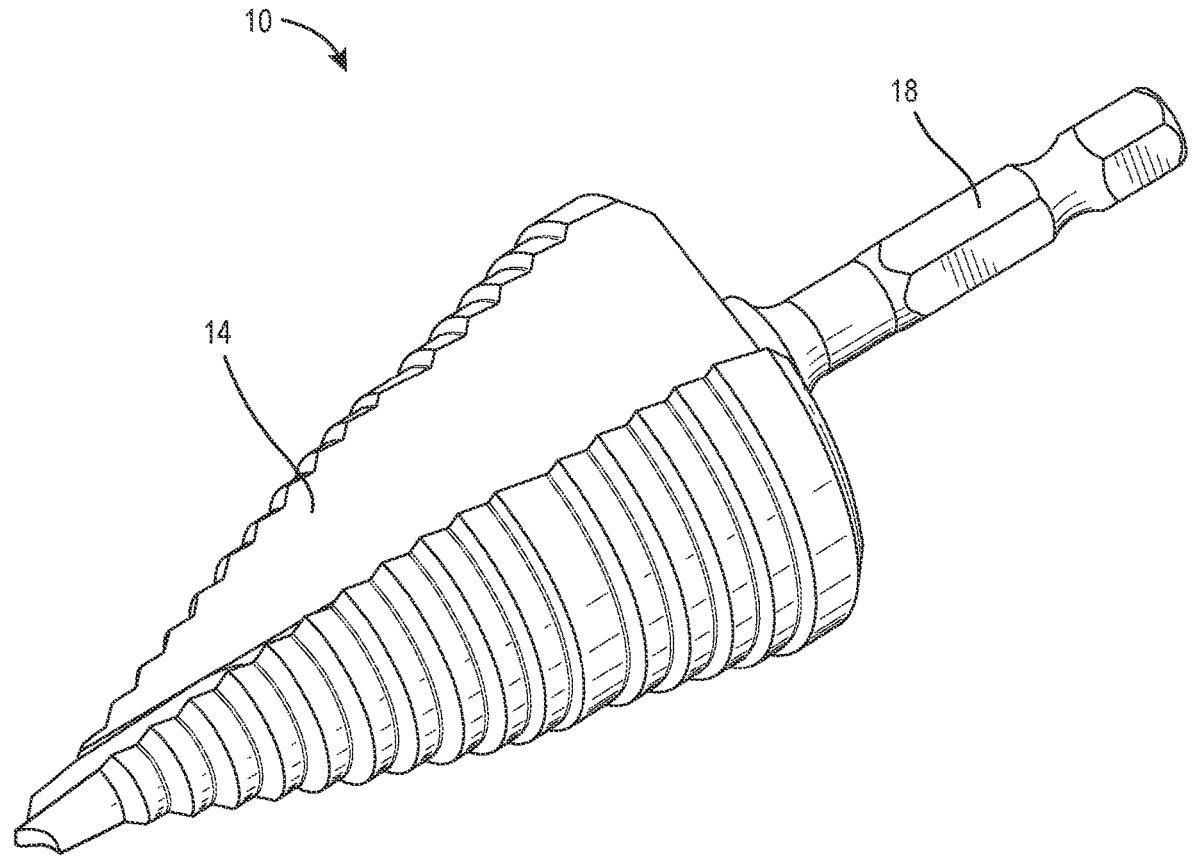
FIG. 1 is a perspective view of a drilling tool including a step drill bit and a drive assembly.

FIG. 1 illustrates a drilling tool 10 including a step drill bit 14 and a drive assembly 18. The step drill bit 14 is configured to cut (e.g., drill) a hole in a work piece. The drive assembly 18 is configured to connect the drilling tool 10 to a power tool, such as a drill. In the illustrated embodiment, the drive assembly 18 is removably coupled to the step drill bit 14. As such, the step drill bit 14 may be a first material and the drive assembly 18 may be a second material that is different than the first material. In other embodiments, the drive assembly 18 may be integrally formed as a single piece with the step drill bit 14 or may be permanently coupled (e.g., welded) to the step drill bit 14.

Figure 2:
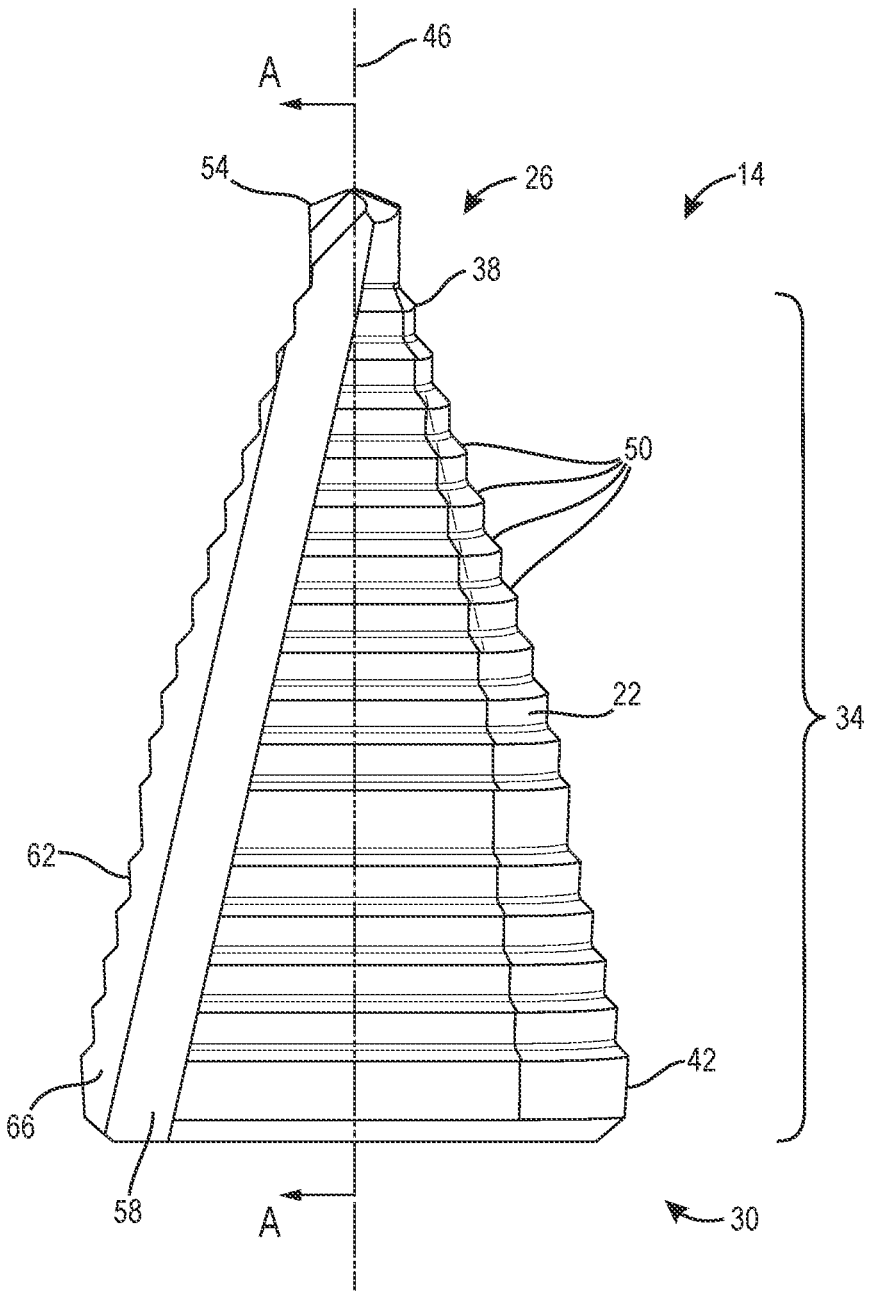
FIG. 2 is an elevational view of the step drill bit of the drilling tool of FIG. 1.

With reference to FIG. 2, the step drill bit 14 includes a body 22 with a first or distal end 26 and a second or proximal end 30 opposite the distal end 26. The body 22 defines a plurality of axially stacked, progressively sized steps 34 between a terminal step 38 adjacent the distal end 26 and a first step 42 adjacent the proximal end 30. The steps 34 are axially stacked in that the steps 34 are coaxially arranged along a bit axis 46 that extends centrally through the body 22. The bit axis 46 is also an axis of rotation about which the drilling tool 10 rotates during use. In addition, the steps 34 are progressively sized in that the steps 34 incrementally increase in size (e.g., diameter) from the distal end 26 to the proximal end 30. In the illustrated embodiment, the step drill bit 14 includes sixteen axially stacked steps 34. In other embodiments, the step drill bit 14 may include fewer or more steps 34, and/or each step 34 may have a different diameter. Each step 34 includes a radial relief 50 that extends from one step 34 to an adjacent step 34. The illustrated radial reliefs 50 are chamfered or angled surfaces. The step drill bit 14 also includes a cutting tip 54 that extends axially along the bit axis 46 from the terminal step 38. The cutting tip 54 assists the step drill bit 14 in grabbing a workpiece before the steps 34 begins to cut through the workpiece. In some embodiments, the step drill bit 14 may not include a cutting tip and instead the body 22 ends at the terminal step 38.

The step drill bit 14 further includes one or more flutes 58. Each flute 58 includes an elongated groove formed in the body 22. An edge of the flute 58 defines a cutting edge 62 of the step drill bit 14. The illustrated flute 58 extends from the cutting tip 54 to the first step 42. In other embodiments, the flute 58 may only extend along a portion of the body 22. In the illustrated embodiment, the step drill bit 14 includes two flutes 58. In other embodiments, the step drill bit 14 may include a single flute 58 or more than two flutes 58. A rake face 66 is defined between the cutting edge 62 and the flute 58.

Figure 3:
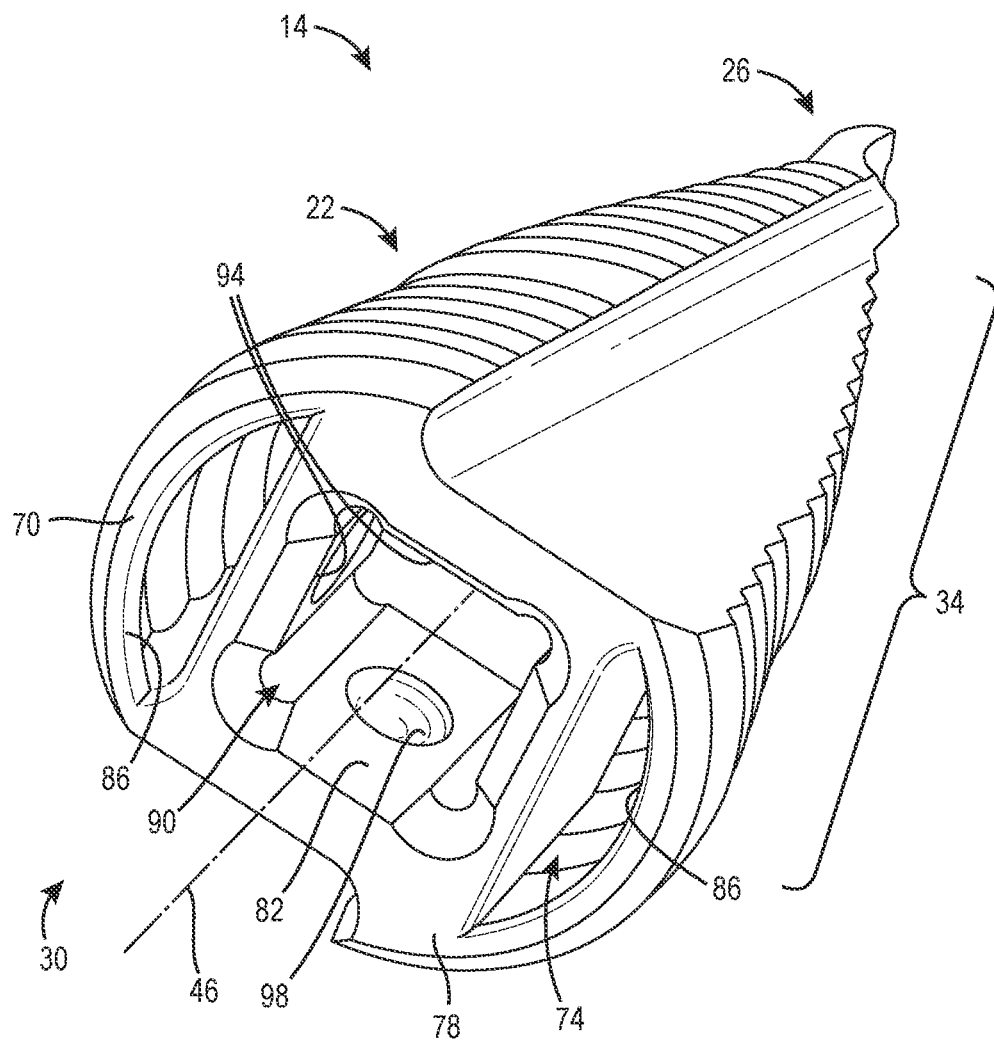
FIG. 3 is a perspective view of the step drill bit of FIG. 2.
Figure 4:
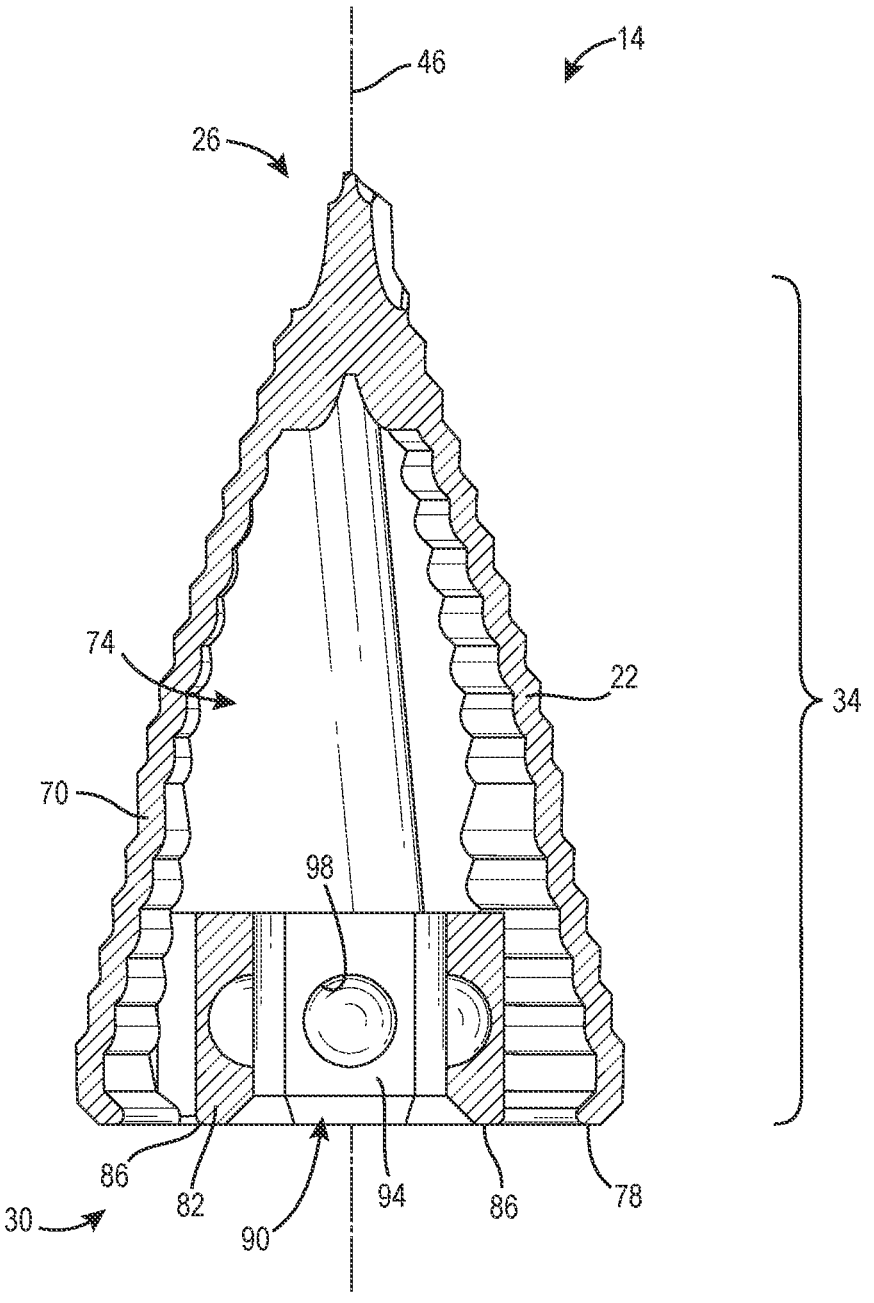
FIG. 4 is a cross-sectional view of the step drill bit of FIG. 2 taken along lines A-A.

With reference to FIGS. 3 and 4, the body 22 of the step drill bit 14 is generally hollow. In other words, the body 22 of the step drill bit 14 is defined by a wall 70 that extends circumferentially about the bit axis 46 to define a cone-shaped body. The wall 70 defines the steps 34 of the step drill bit 14. The wall 70 further defines an interior cavity 74 of the step drill bit 14 that makes the step drill bit 14 hollow. The interior cavity 74 is open to outside of the step drill bit 14 at the proximal end 30 of the body 22. More specifically, the interior cavity 74 extends through a bottom 78 of the step drill bit 14 at the proximal end 30. The interior cavity 74 extends at least partially through the body 22 toward the distal end 26 (e.g., toward the terminal step 38 and the cutting tip 54). In the illustrated embodiment, the thickness of the wall 70 is at least 2 millimeters thick. In other embodiments, the thickness of the wall 70 may be greater than or less than 2 millimeters thick.

The illustrated interior cavity 74 includes a drive socket 82 and one or more side openings 86. The drive socket 82 defines an opening 90 that receives a portion of the drive assembly 18 to connect the drive assembly 18 to the step drill bit 14. In the illustrated embodiment, the opening 90 of the drive socket 82 is square-shaped to receive a square-shaped drive assembly. In other embodiments, the drive socket 82 may be hex-shaped, circularly-shaped, or other shapes. The opening 90 is defined by a plurality of inner faces 94. In the illustrated embodiment, the opening 90 is defined by four inner faces 94 to make the drive socket 82 square-shaped. At least one of the inner faces 94 includes a detent recess 98 that receives a ball detent of the drive assembly 18 to releasably secure the drive assembly 18 to the step drill bit 14. In the illustrated embodiment, each inner face 94 includes a detent recess 98 such that the drive assembly 18 can be inserted into the drive socket 82 in any orientation.

The side openings 86 are located between the drive socket 82 and the outer surface of the wall 70. In the illustrated embodiment, the interior cavity 74 includes two side openings 86 positioned on opposite sides of the drive socket 82. The side openings 86 are also not positioned on the same sides of the drive socket 82 as the flutes 58 such that the side openings 86 are located in relatively wider areas of the step drill bit 14. In some embodiments, the side openings 86 are at least partially separated from the drive socket 82 by the inner faces 94. In other embodiments, the side openings 86 may not be separated from the drive socket 82. In some embodiments, the interior cavity 74 may include fewer or more side openings 86. Alternatively, the side openings 86 may be omitted.

In some embodiments, the step drill bit 14 is manufactured using an additive manufacturing process, such as 3D printing. Specifically, the step drill bit 14 is made by adding layer-upon-layer of metal material to create the general shape of the step drill bit 14. In some embodiments, the metal material may be, for example, M2 tool steel. To create the step drill bit 14 using 3D printing, a 3D drawing of the step drill bit 14 may be produced in a computer aided design (CAD) software program. Then, a printing machine reads data from the CAD file and lays down or adds successive layers of liquid powder metals in a layer-upon-layer fashion to fabricate the step drill bit 14. Different sizes and/or shapes of step drill bits (e.g., step drill bits having different numbers of steps, flutes, etc.) may be made using this process.

By using an additive manufacturing process, the interior cavity 74 of the step drill bit 14 may be formed in the body 22 without having to later remove material from the step drill bit 14. This process helps reduce costs by not wasting excess material. In addition, the shape of the interior cavity 74 can be more precisely designed.

In other embodiments, the step drill bit 14 is manufactured using a molding process, such as metal injection molding (MIM). During MIM, a feedstock of powder material, including a metal powder and a binder, are placed into an injection molding machine. The injection molding machine heats the feedstock and injects the feedstock into a mold cavity under high pressure. The overall shape of the drill bit is formed in the mold cavity. The mold of the step drill bit 14 is then sintered in a furnace to set the step drill bit 14. Similar to the additive manufacturing processing, MIM allows the interior cavity 76 to be efficiently formed in the body 22.

In some embodiments, after the additive manufacturing or molding process, the cutting edge 62 may be cladded (e.g., laser cladded) to add strength to the highest wear spots of the step drill bit 14. For example, a portion of the cutting edge 62 adjacent the cutting tip 54 may have a cladded buildup of at least 5 mm thick and the rest of the cutting edge 62 may have a cladded buildup of at least 3 mm thick. In some embodiments, the cladded build up may be consistent for the entire length of the cutting edge 62. Alternatively, the cladded buildup for the portion adjacent the cutting tip 54 may be more than or less than 5 mm. Similarly, the rest of the cutting edge 62 may have a cladded buildup of more than or less than 3 mm.

In some embodiments, whether with or without cladding, the step drill bit 14 is then heat treated at a desired setting. Heat treatment helps harden the entire step drill bit 14 or portions of the step drill bit 14 to desired specifications. After heat treating, the step drill bit 14 is ground to its final form. Grinding includes sharpening edges and/or removing imperfections on the body 22 to achieve the final step drill bit 14. In the illustrated embodiment, the step drill bit 14 is made from the additive manufacturing process or the molding process using M2 steel. In other embodiments, the step drill bit 14 may be made using other metals. For example, in embodiments, where the cutting edge 62 is cladded, the step drill bit 14 may be formed of a less expensive and strong base material.

Due to creating the step drill bit 14 using additive manufacturing or molding, the step drill bit 14 is produced at near net shape. In other words, after the additive manufacturing process or molding process is completed, the step drill bit 14 is generally at final form. Specifically, using these processes allows each step 34 of the body 22 to be formed with a radial relief 50, reducing the need to separately grind in the radial relief 50 as would be necessary in other manufacturing processes. Instead, the step drill bit 14 only needs to be ground at the end to sharpen edges, where needed.

Figure 5:
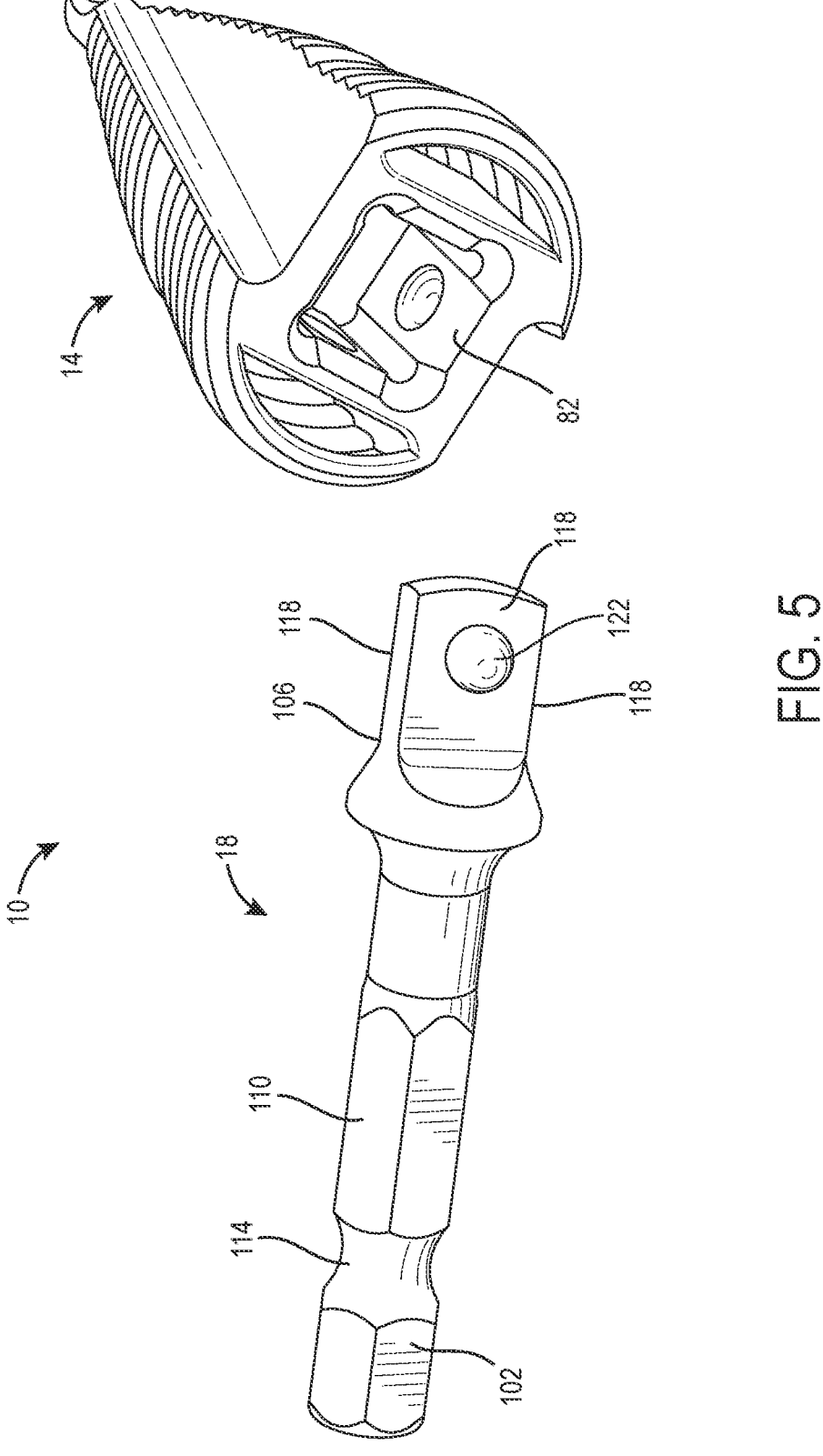
FIG. 5 is an exploded view of the drilling tool of FIG. 1.

As shown in FIG. 5, the illustrated drive assembly 18 includes a shank 102 and a drive head 106. The shank 102 is configured to be coupled to the power tool. In the illustrated embodiment, the shank 102 includes a hex-shaped shaft 110 having an annular groove 114 that is configured to be received in and engaged by a chuck of the power tool. In other embodiments, the shank 102 may include other suitable shafts or coupling mechanisms for connecting to a power tool. In the illustrated embodiment, the drive head 106 is a ⅜" square drive to correspond to the square-shaped drive socket 82 in the step drill bit 14. The drive head 106 includes a plurality of outer faces 118, corresponding to the shape of the drive head 106. A ball detent arrangement 122 is coupled to the drive head 106 on one of the outer faces 118. The ball detent arrangement 122 includes a spring (not shown) and is configured to engage with the detent recess 98 of the drive socket 82. The drive assembly 18 may be formed of an impact resistant steel alloy, such as, e.g., SAE 6150 low-alloy steel. The impact resistant steel may be hardened to a Rockwell-C hardness between approximately 48 HRc and approximately 58 HRc for higher impact resistance.

To assemble the drilling tool 10, a user may align the drive head 106 of the drive assembly 18 axially with the opening 90 of the drive socket 82. As the user inserts the drive assembly 18 into the drive socket 82, the ball detent arrangement 122 is forced inwards against the bias of the spring by the inner faces 94 of the opening 90. Once the drive head 106 is inside the opening 90, the ball detent arrangement 122 is biased by the spring to extend into one the detent recesses 98 and secure the drive assembly 18 to the step drill bit 14. The ball detent arrangement 122 may be forced against the bias of the spring to remove the drive assembly 18 from the step drill bit 14 to be replaced. Accordingly, the overall tool life of the drilling tool 10 may be increased by providing a drive assembly 18 made of a first material with high impact resistance and a step drill bit 14 made of a second material with high wear resistance. In some embodiments, the first and second materials are the same material. In other embodiments, a coating may be applied to both the step drill bit 14 and the drive assembly 18.

Figure 7:
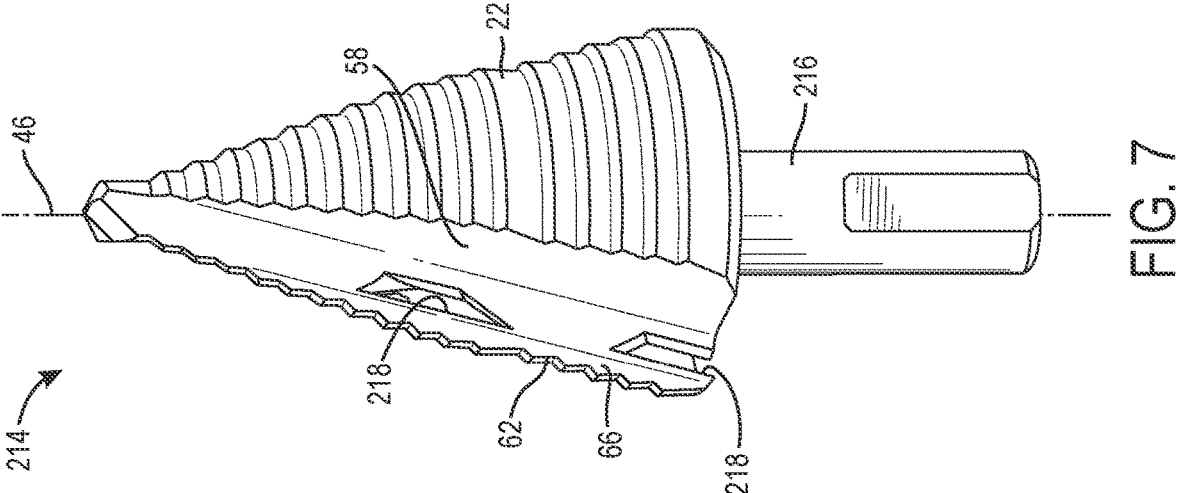
FIG. 7 is a second side view of the step drill bit of FIG. 6.
Figure 6:
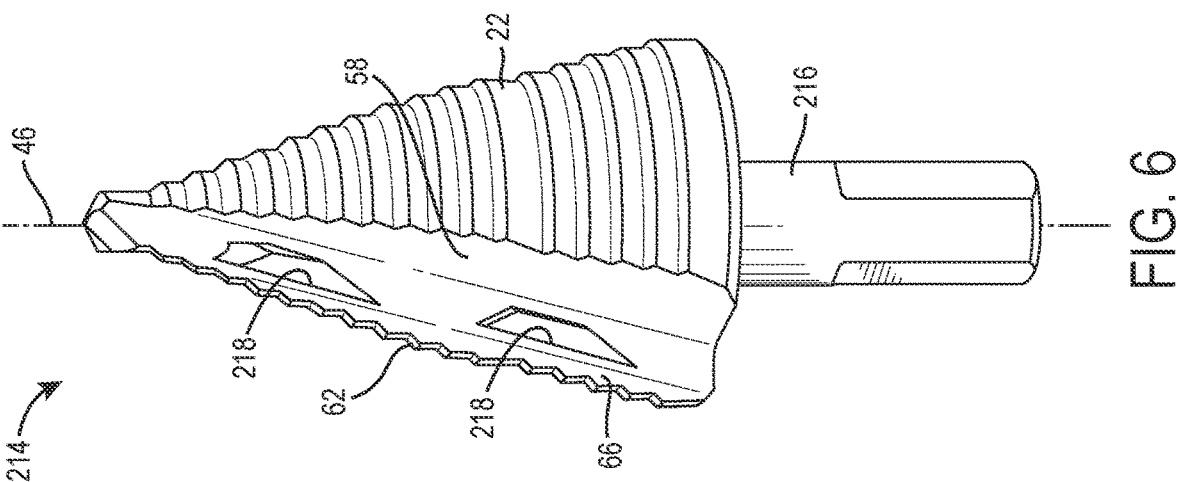
FIG. 6 is a first side view of a step drill bit according to another embodiment of the invention.

FIGS. 6 and 7 illustrate a step drill bit 214 according to another embodiment of the invention. The step drill bit 214 is similar to the step drill bit 14 with like features being represented by like reference numbers. The step drill bit 214 is also formed using an additive manufacturing process or a molding process. In the illustrated embodiment, however, the step drill bit 214 is integrally formed with a shank 216. The illustrated shank 216 also includes a different configuration than the shank 102, such as an SDS configuration.

In the illustrated embodiment, the step drill bit 214 includes one or more openings 218 in the flutes 58. Specifically, the openings 218 are positioned adjacent the rake face 66 of the cutting edges 62. The openings 218 extend to the interior cavity 74 of the body 22. In the illustrated embodiment, each flute 58 includes two openings 218. In other embodiments, each flute 58 may include one opening 218 or more than two openings 218. The openings 218 may extend along a portion of the cutting edge 62. The portion may be one-fifth of the total length of the cutting edge 62. In other embodiments, the openings 218 may be more than one-fifth of the total length or less than one-fifth of the total length of the cutting edge 62. In the illustrated embodiment, the openings 218 positioned on one flute 58 are offset axially along the bit axis 46 from the openings 218 on the other flute 58.

The openings 218 help with debris removal during a drilling operation of the drilling tool 10. Specifically, the openings 218 allow chips from a workpiece to enter into the interior cavity 74 to remove the chips from the flutes 58. As such, the openings 218 may also be referred to as chip capture slots. By facilitating the removal of chips from the flutes 58, the openings 218 make the step drill bit 214 more effective at cutting into the workpiece.

Although aspects have been described in detail with reference to certain embodiments, variations and modifications exist within the scope of one or more independent aspects as described. For example, the openings 218 in the flutes 58 may also or alternatively be incorporated in a step drill bit having a separate shank, such as the step drill bit 14 shown in FIGS. 1-5. Similarly, the interior cavity 74 may also or alternatively be incorporated in a step drill bit having an integral shank, such as the step drill bit 214 shown in FIGS. 6 and 7. Various features and advantages are set forth in the following claims.

What is claimed is:

1. A drilling tool comprising:
   a drive assembly including a shank that is configured to couple to a power tool; and
   a step drill bit including
   a body having a proximal end adjacent the shank, a distal end opposite the proximal end, and a bit axis extending centrally through the body between the proximal end and the distal end, the body being defined by a wall extending around the bit axis to define a hollow interior cavity of the body, the wall extending from the proximal end to the distal end, the body including a drive socket that receives the drive assembly, the drive socket positioned within the hollow interior cavity, the drive socket is defined by a plurality of inner faces that are spaced and separate from the wall,
   a plurality of axially stacked, progressively sized steps including a first step at the proximal end and a terminal step at the distal end, and
   a flute extending from the proximal end to the distal end, the flute defining a cutting edge,
   wherein the bit axis extends through the hollow interior cavity.

2. The drilling tool of claim 1, wherein the step drill bit further includes an opening positioned on the flute that extends into the hollow interior cavity.

3. The drilling tool of claim 1, wherein the drive assembly is removably coupled to the step drill bit.

4. The drilling tool of claim 3, wherein the drive assembly includes a drive head, and wherein the drive socket receives the drive head.

5. The drilling tool of claim 1, wherein the step drill bit is made of a first material and the drive assembly is made of a second material that is different than the first material.

6. The drilling tool of claim 5, wherein the first material is a high wear resistant material and the second material is a high impact material.

7. The drilling tool of claim 1, wherein the cutting edge is cladded.

8. The drilling tool of claim 1, wherein the step drill bit is manufactured using an additive manufacturing process or a molding process.

9. The drilling tool of claim 1, wherein the wall has a thickness that is at least 2 millimeters.

10. The drilling tool of claim 1, wherein each step of the plurality of steps includes a radial relief that extends from each step to an adjacent step.

11. The drilling tool of claim 1, wherein the body includes a bottom that defines an opening that extends into the hollow interior cavity.

12. The drilling tool of claim 1, wherein the body of the step drill bit includes a side opening that is positioned between the drive socket and the wall.

13. The drilling tool of claim 12, wherein the drive socket and the side opening extend into the hollow interior cavity.

14. The drilling tool of claim 1, wherein the drive socket is spaced from the hollow interior cavity.

\* \* \* \* \*